US008903204B2

(12) United States Patent
Nair et al.

(10) Patent No.: US 8,903,204 B2
(45) Date of Patent: Dec. 2, 2014

(54) OPTICAL INTERCONNECT SYSTEMS AND METHODS

(75) Inventors: Rohit Nair, Newark, DE (US); Tian Gu, Newark, DE (US); Michael W. Haney, Oak Hill, VA (US)

(73) Assignee: University of Delaware, Newark, DE (US)

( * ) Notice: Subject to any disclaimer, the term of this patent is extended or adjusted under 35 U.S.C. 154(b) by 473 days.

(21) Appl. No.: 13/082,547

(22) Filed: Apr. 8, 2011

(65) Prior Publication Data

US 2011/0249933 A1   Oct. 13, 2011

Related U.S. Application Data

(60) Provisional application No. 61/322,557, filed on Apr. 9, 2010.

(51) Int. Cl.
| | |
|---|---|
| *G02B 6/00* | (2006.01) |
| *G02F 1/035* | (2006.01) |
| *G02B 6/43* | (2006.01) |
| *G02B 6/12* | (2006.01) |
| *G02B 6/42* | (2006.01) |

(52) U.S. Cl.
CPC ........ *G02B 6/43* (2013.01); *G02B 2006/12173* (2013.01); *G02B 6/4214* (2013.01)
USPC ...................................... 385/14; 385/1; 385/2

(58) Field of Classification Search
CPC ........ G02B 6/00; G02B 6/12; G02B 27/4205; G02B 6/122
USPC .................................................. 385/14, 1, 2
See application file for complete search history.

(56) References Cited

U.S. PATENT DOCUMENTS

| | | | | |
|---|---|---|---|---|
| 6,021,232 | A * | 2/2000 | Madabhushi | 385/3 |
| 8,213,751 | B1 * | 7/2012 | Ho et al. | 385/14 |
| 2003/0138179 | A1 * | 7/2003 | Akiyama et al. | 385/2 |
| 2005/0201715 | A1 * | 9/2005 | Ellwood, Jr. | 385/147 |
| 2010/0014800 | A1 * | 1/2010 | Derose et al. | 385/2 |

OTHER PUBLICATIONS

Avci, U. et al., "A novel compact circuit for 4-PAM energy-efficient high speed interconnect data transmission and reception," Microelectronics Journal 36 (2005), pp. 67-75.
Dillon, T. et al., "Continuous-tone grayscale mask fabrication using high-energy-beam-sensitive glass," J. Microlith., Microfab., Microsyst., vol. 3, No. 4, Oct. 2004, pp. 550-554.

* cited by examiner

*Primary Examiner* — Kaveh Kianni
(74) *Attorney, Agent, or Firm* — RatnerPrestia

(57) ABSTRACT

Optical interconnect systems and methods are disclosed. An optical interconnect system includes a substrate, an optical waveguide, and first and second modulators. The optical waveguide has a first waveguide portion extending to a first coupling structure, a second waveguide portion extending from the first coupling structure to a second coupling structure, and a third waveguide portion extending from the second coupling structure. The first modulator is positioned adjacent the first coupling structure, and the second modulator is positioned adjacent the second coupling structure. The optical interconnect method includes modulating light with a first modulator to produce one-time modulated light, and modulating the one-time modulated light with a second modulator to produce two-time modulated light.

10 Claims, 7 Drawing Sheets

OPTICAL INTERCONNECT SYSTEMS AND METHODS

CROSS REFERENCE TO RELATED APPLICATIONS

This application claims priority to U.S. patent application No. 61/322,557, entitled "DUAL-CHANNEL OPTICAL MULTIPLEXER AND FOUR-LEVEL OPTICAL PULSE AMPLITUDE MODULATOR," filed on Apr. 9, 2010, the contents of which are incorporated herein by reference in their entirety.

FIELD OF THE INVENTION

The present invention relates generally to optical interconnect systems and methods, and more particularly, to optical multiplexers and optical pulse amplitude modulators.

BACKGROUND OF THE INVENTION

Conventional integrated circuits employ metal interconnections, i.e. metal wires, for chip-scale communication (e.g, on-chip and chip-to-chip interconnects). The requirements of speed and processing power in computing continues to push the industry to smaller and smaller integrated circuits. As it does so, metal interconnections on integrated circuits may become problematic due to size, layout, and/or power constraints. Integrated circuits that employ optical interconnections may provide a viable solution to the growing bandwidth requirements in modern microprocessors. As demands on performance for microprocessors increase, improvements in optical interconnections are desired.

SUMMARY OF THE INVENTION

Aspects of the present invention relate to optical interconnect systems and methods.

In accordance with one aspect of the present invention, an optical interconnect system is disclosed. The optical interconnect system includes a substrate, an optical waveguide disposed on the substrate, and first and second modulators. The optical waveguide has a first waveguide portion extending to a first coupling structure, a second waveguide portion extending from the first coupling structure to a second coupling structure, and a third waveguide portion extending from the second coupling structure. The first modulator and second modulators are mounted to the substrate. The first modulator is positioned adjacent the first coupling structure, and the second modulator is positioned adjacent the second coupling structure.

In accordance with another aspect of the present invention, an optical interconnect method is disclosed. The optical interconnect method includes transmitting light through a first portion of an optical waveguide to a first coupling structure, modulating the light from the first portion with a first modulator positioned adjacent the first coupling structure to produce one-time modulated light, transmitting the one-time modulated light through a second portion of the optical waveguide to a second coupling structure, modulating the one-time modulated light from the second portion with a second modulator positioned adjacent the second coupling structure to produce two-time modulated light, and transmitting the two-time modulated light through a third portion of the optical waveguide.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures.

DETAILED DESCRIPTION OF THE INVENTION

The exemplary systems and methods disclosed herein utilize light as a means for intrachip or interchip optical communication. As used herein, the terms "light" and "optical" are intended to encompass all wavelengths of electromagnetic radiation, and are not intended to be limited to the visible light region. It will be understood from the description herein that the disclosed systems and methods may be usable with electromagnetic radiation outside of the visible light spectrum such as, for example, infrared radiation or ultraviolet radiation.

The exemplary systems and method disclosed herein are usable in conjunction with integrated circuit chips. For example, the disclosed systems and methods may be silicon complementary metal-oxide-semiconductor (CMOS) compatible. The exemplary systems and methods disclosed herein are suitable to provide a high bandwidth, high coupling efficiency, low power consumption, single layer and easily manufacturable optical interconnect architecture with a very small footprint.

Figure 1:
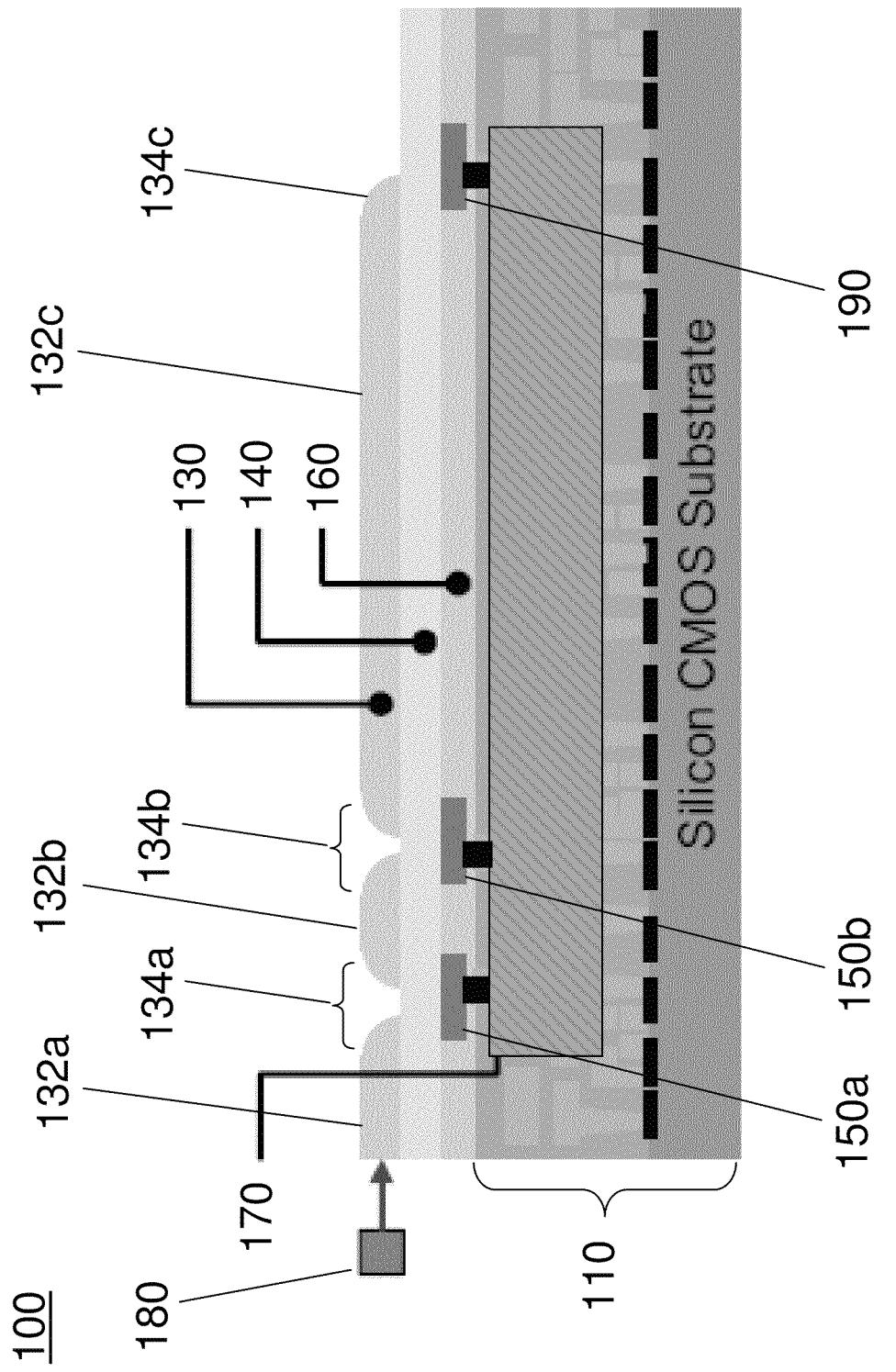
FIG. 1 is a diagram illustrating an exemplary optical interconnect system in accordance with aspects of the present invention.
Figure 2:
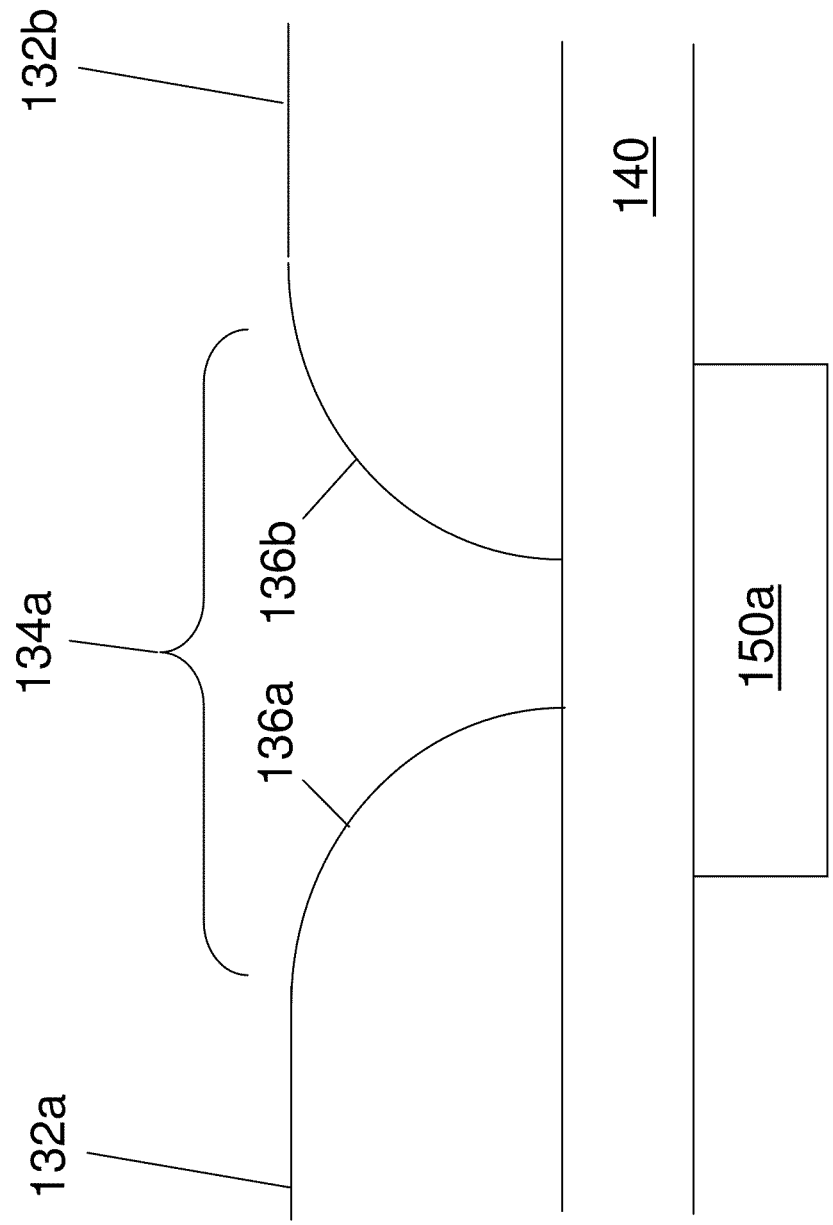
FIG. 2 is a diagram illustrating an exemplary coupling structure of the optical interconnect system of FIG. 1.
Figure 3:
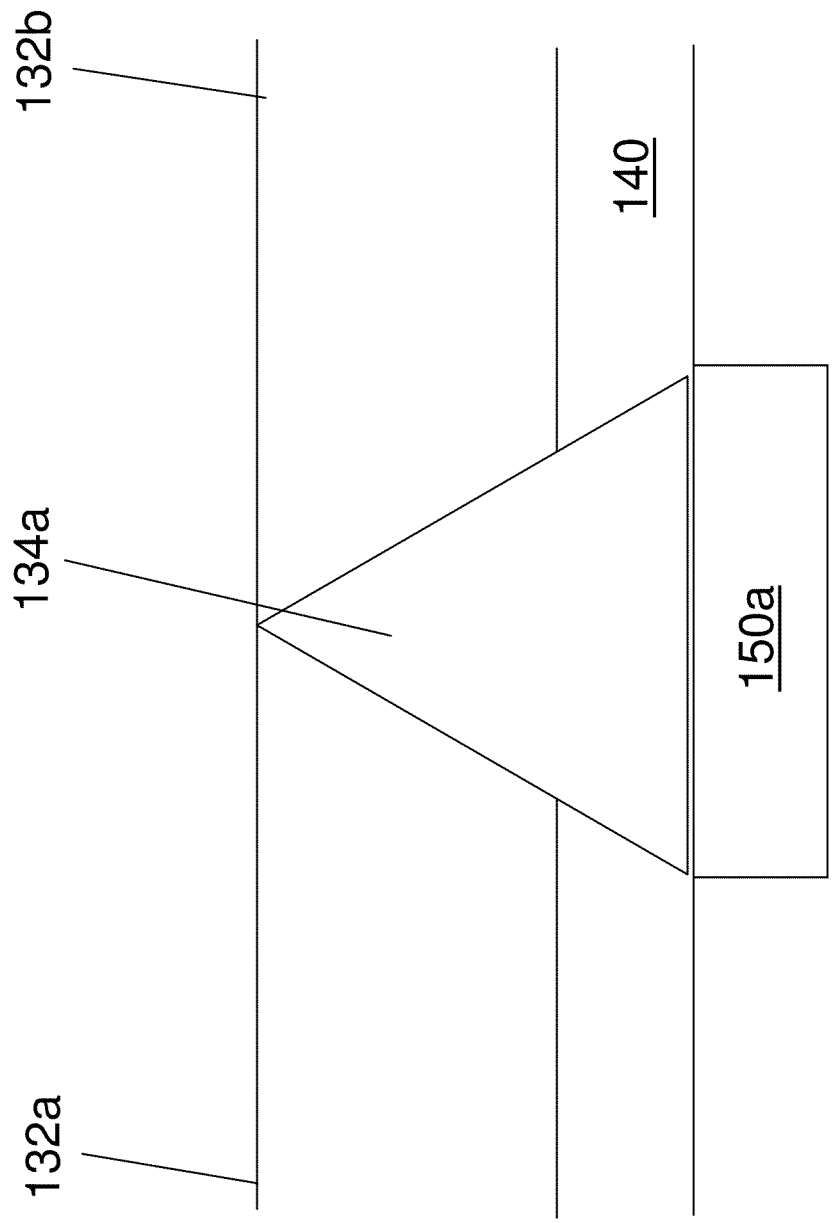
FIG. 3 is a diagram illustrating another exemplary coupling structure of the optical interconnect system of FIG. 1.

Referring now to the drawings, FIGS. 1-3 illustrate an exemplary optical interconnect system 100 in accordance with aspects of the present invention. System 100 may be used as part of an integrated circuit chip. As a general overview, system 100 includes a substrate 110, an optical waveguide 130, and modulators 150. Additional details of system 100 are described herein.

Substrate 110 is a base layer of optical interconnect system 100, as illustrated in FIG. 1. In an exemplary embodiment, substrate 110 is the substrate of the integrated circuit chip. Substrate 110 includes electrical circuitry 170 for controlling the operation of optical interconnect system 100. Electrical circuitry 170 of substrate 110 includes metal interconnections, such as one or more metal interconnect layers, and metal vias electrically connecting the one or more metal interconnect layers. In a preferred embodiment, substrate 110 is a conventional CMOS silicon substrate. Suitable materials for forming substrate 110 will be known to one of ordinary skill in the art from the description herein. Additional details regarding electrical circuitry 170 will be provided below.

Optical waveguide 130 is disposed on substrate 110, as shown in FIG. 1. Optical waveguide 130 at least partially confines a beam of light. Optical waveguide 130 may comprise, for example, a dielectric waveguide, a flexible waveguide film, and/or one or more optical fibers. Materials for optical waveguide 130 may be chosen in order to minimize the loss of the light (e.g., leakage through the walls of the waveguide) during transmission of the light through the waveguide. Optical waveguide 130 may include multiple channels for the propagation of light. Optical waveguide 130 may further include low-loss waveguide crossings and/or turns.

Suitable materials for forming optical waveguide 130 include, for example, conventional optical waveguide polymers. Suitable optical polymer materials include AZ P4620 and Microposit SPR220-4.5. Other suitable materials will be known to one of ordinary skill in the art from the description herein.

Optical waveguide 130 includes a plurality of waveguide portions 132 and a plurality of coupling structures 134, as shown in FIGS. 1-3. In an exemplary embodiment, optical waveguide 130 includes a first waveguide portion 132a extending to a first coupling structure 134a, a second waveguide portion 132b extending from the first coupling structure 134a to a second coupling structure 134b, and a third waveguide portion 132c extending from the second coupling structure 134b. It will be understood by one of ordinary skill in the art that optical waveguide 130 is not limited to the above components, but may include additional waveguide portions 132n and coupling structures 134n as desired.

Coupling structures 134 are disposed within optical waveguide 130. Coupling structures 134 couple light propagating through waveguide portions 132 onto modulators 150. Coupling structures 134 further couple light reflected from modulators 150 back into waveguide portions 132. Coupling structures 134 may comprise any structures adapted to redirect light. Exemplary embodiments of coupling structure 134s are described below.

In one exemplary embodiment, coupling structures 134 are tapered ends of waveguide portions 132, as illustrated in FIGS. 1 and 2. In this embodiment, coupling structure 134a includes a tapered end 136a of first waveguide portion 132a that is configured to redirect light propagating through first waveguide portion 132a onto modulator 150a. The coupling structure 134a further includes a tapered end 136b of second waveguide portion 132b that is configured to redirect light reflected from modulator 150a into the second waveguide portion 132b. Tapered ends 136 of the waveguide portions 132 are spaced from each other by a gap. Tapered ends 136 of coupling structure 134 may be configured to redirect light based on their shape, and based on the materials of the waveguide portions 132, as would be understood to one of ordinary skill in the art from the description herein. For example, when a waveguide with a refractive index of 1.4 is used, a pair of flat tapered ends 136 with angles greater than 45 degrees may be used with an air gap in the middle to redirect the light onto the modulator 150. For another example, tapered ends may have round, circular faces, as shown in FIGS. 1 and 2. The selection of tapered ends 136 that maximize the coupling of light onto modulator 150 will be understood to one of ordinary skill in the art from the description herein.

In another exemplary embodiment, coupling structures 134 are prism elements, as illustrated in FIG. 3. In this embodiment, coupling structure 134a is a prism element positioned between waveguide portions 132a and 132b. Coupling structure 134a is configured to redirect light transmitted through first waveguide portion 132a onto modulator 150a. Coupling structure 134a is further configured to redirect light reflected from modulator 150a into second waveguide portion 132b. Prism elements may be configured to redirect light based on the shape, size, or materials used to form the prism, as would be understood to one of ordinary skill in the art from the description herein. Suitable materials for forming prism elements include, for example, Si, GaAs, GaP, InP, InAs, Ge, GaSb, AlN, BN, InSb, C, InN, GaN, LiNbO$_3$, polymers, optical glasses, photoresists, and other optical materials that can meet the desired index contrast between the prism element and the optical waveguide. Other suitable materials for forming coupling structures 134 will be understood by one of ordinary skill in the art from the description herein.

Optical waveguide 130 may be formed above, below, or within a waveguide confining layer 140 formed from a material having a lower refractive index than waveguide 130, in order to confine the light within the waveguide 130. Suitable materials for use as waveguide confining layer 140 include, for example, polymers and SiO$_2$. Other suitable materials for use as waveguide confining layer 140 will be known to one of ordinary skill in the art from the description herein.

Modulators 150 are mounted to substrate 110, as shown in FIG. 1. Modulators 150 may be embedded in an epoxy layer 160. Optical interconnect system 100 includes a number of modulators 150 corresponding to the number of coupling structures 134 of optical waveguide 130. For example, modulator 150a may be positioned adjacent (e.g., beneath) coupling structure 134a, and modulator 150b may be positioned adjacent (e.g., beneath) coupling structure 134b. As set forth above, coupling structure 134a is configured to redirect light from waveguide portion 132a into modulator 150a, and coupling structure 134b is configured to redirect light from waveguide portion 132b into modulator 150b.

Modulators 150 may be mounted to substrate 110, for example, by flip-chip bonding. In an exemplary embodiment, modulators 150 are GaAs/GaAlAs multiple quantum well (MQW) modulators. MQW devices may exhibit the quantum confined Stark effect such that the optical absorption of the devices is strongly dependent on the electric field applied perpendicular to the wells. Thus, modulators 150 may be configured to modulate the light traveling through optical waveguide 130 by either partially absorbing or substantially reflecting the light received from coupling structures 134, dependent on an applied electric field. Modulators 150 may modulate the light in order to encode a stream of data into the light propagating through optical waveguide 130.

Modulators 150 are interconnected with the electrical circuitry 170 in substrate 110, e.g., by normal metal wire interconnects. Modulators 150 may include bump bonds for electrically connecting modulators 150 to electrical circuitry 170. The electrical circuitry 170 in substrate 110 may be configured to switch modulators 150 on and off in order to cause modulators 150 to partially absorb or substantially reflect the light received from coupling structures 134. Electrical circuitry 170 may switch modulators 150 by applying a bias voltage to modulators 150, as described below with reference to the operation of optical interconnect system 100.

It will be understood that optical interconnect system 100 is not limited to the above components, but may include alternative components and additional components, as would be understood by one of ordinary skill in the art from the description herein.

Optical interconnect system 100 may include a light source 180, as illustrated in FIG. 1. Light source may be mounted to substrate 110, or may be separate from substrate 110. Light source 180 is positioned to provide the light to first waveguide portion 132*a*. In an exemplary embodiment, light source 180 is an external continuous wave (CW) laser. Suitable lasers for use as light source 180 include, for example, vertical-cavity surface-emitting lasers (VCSELs) and distributed feedback (DFB) lasers. Alternatively, light source 180 may be an LED. Other suitable light sources 150 for use with the present invention will be understood to one of ordinary skill in the art from the description herein.

Optical interconnect system 100 may further include a photosensor 190, as illustrated in FIG. 1. Photosensor 190 is mounted to substrate 110 and positioned to receive light, e.g., from third waveguide portion 132*c*. System 100 may include another coupling structure 134*c* disposed above photosensor 190, configured to redirect the light from third waveguide portion 132*c* onto photosensor 190. In an exemplary embodiment, photosensor 190 is a multiple quantum well modulator, substantially as described above with respect to modulators 150. Photosensor 190 is interconnected with the electrical circuitry 170 in substrate 110. Photosensor 190 receives modulated light from third waveguide portion 132*c*, and is configured to output the data stream encoded in the modulated light to electrical circuitry 170.

Figure 4:
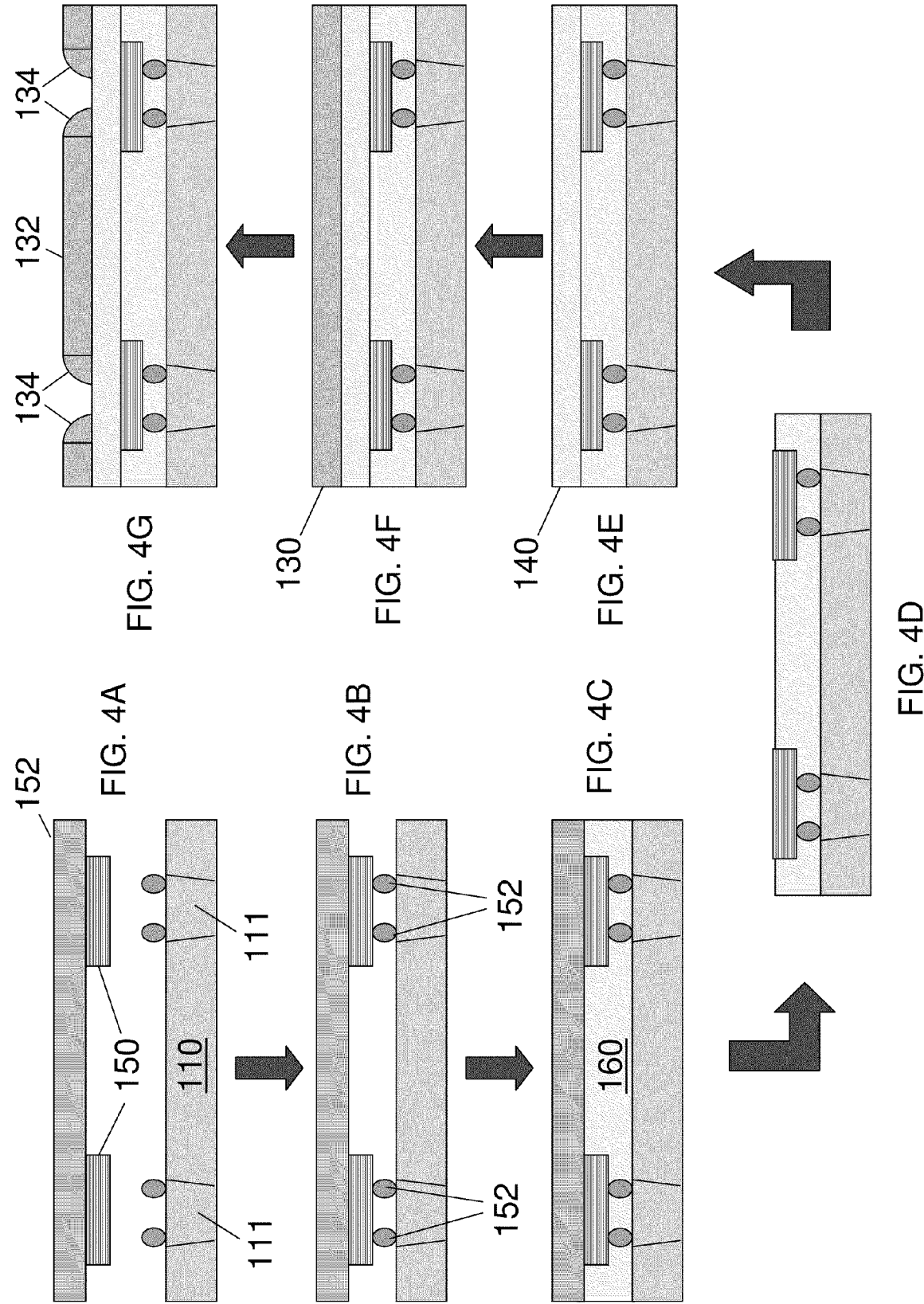
FIGS. 4A-4G are cut away side views illustrating an exemplary fabrication process for the coupling structure of FIG. 2.

The fabrication of an exemplary coupling structure 134 for use in optical interconnect system 100 will now be described with respect to FIGS. 4A-4G. As illustrated in FIGS. 4A and 4B, modulators 150 are attached to substrate 110. Modulators 150 may be attached to substrate 110 by flip-chip bonding. For example, substrate 110 may include a number of vias 111 for enabling metallic interconnects. Modulators 150 may be disposed on a modulator substrate 152 in locations corresponding to the vias 111 in substrate 110. Modulator substrate 152 and substrate 110 can be disposed adjacent one another in order to bond modulators 150 onto substrate 110 using bump bonds 154. As illustrated in FIG. 4C, epoxy layer 160 is flowed between the substrate 110 and modulator substrate 152. Suitable epoxy for epoxy layer 160 will be known to one of ordinary skill in the art from the description herein. Then, as illustrated in FIG. 4D, modulator substrate 152 is removed. The modulator substrate 152 may be removed by an etch-removal process.

As illustrated in FIG. 4E, after the modulator substrate 152 is removed, waveguide confining layer 140 may be formed. The waveguide confining layer may be spun-on in a conventional manner. As illustrated in FIG. 4F, the waveguide 130 is then fabricated on waveguide confining layer 140. The waveguide 130 may be spun-on in a conventional manner. Then, as illustrated in FIG. 4G, the waveguide 130 is patterned to form waveguide portions 132 and coupling structures 134 comprising tapered ends. Coupling structures 134 may be formed by photo-patterning, by etching, or by laser-ablation. It will be understood that the above fabrication steps provide only an example for the fabrication of components of optical interconnect system 100. Additional or alternative steps than those described above will be understood by one of ordinary skill in the art from the description herein.

Figure 5:
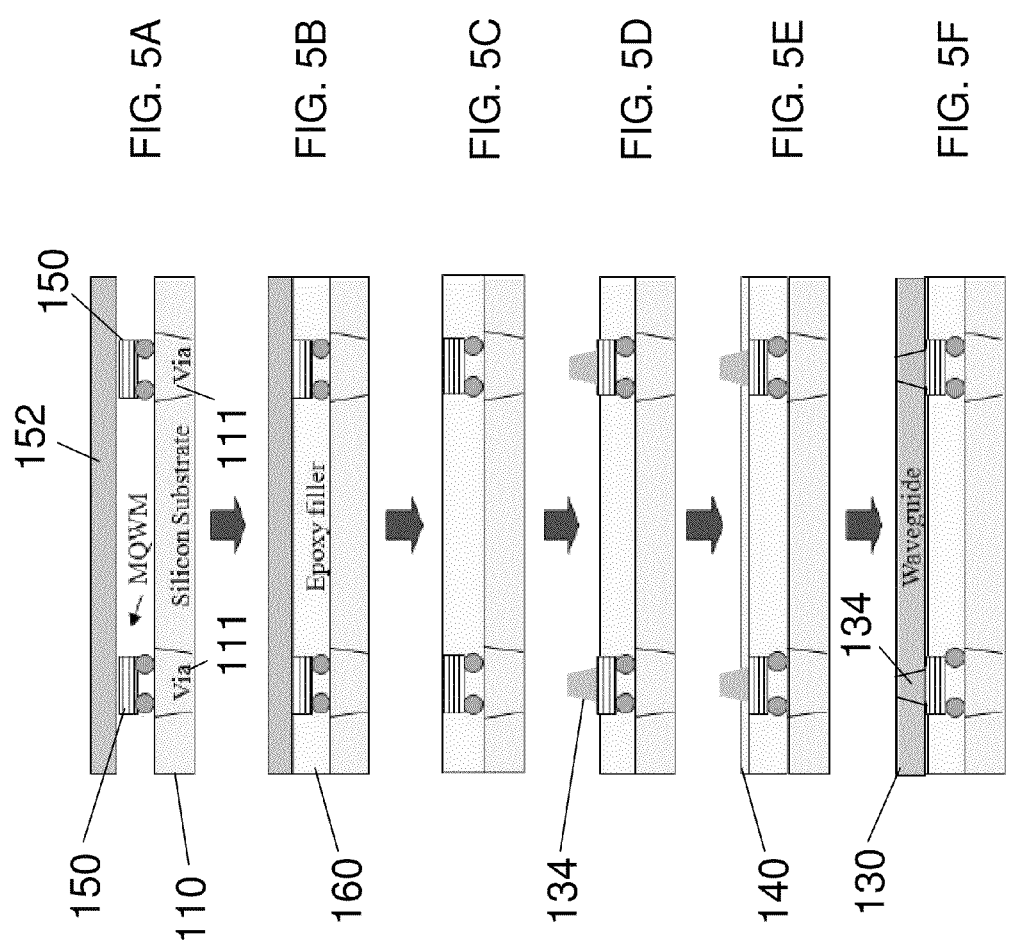
FIGS. 5A-5F are cut away side views illustrating an exemplary fabrication process for the coupling structure of FIG. 3.

The fabrication of another exemplary coupling structure 134 for use in optical interconnect system 100 will now be described with respect to FIGS. 5A-5F. As illustrated in FIG. 5A, modulators 150 are attached to substrate 110. Modulators 150 may be attached to substrate 110 by flip-chip bonding. For example, substrate 110 may include a number of vias 111 for enabling metallic interconnects. Modulators 150 may be disposed on a modulator substrate 152 in locations corresponding to the vias 111 in substrate 110. Modulator substrate 152 and substrate 110 can be disposed adjacent one another in order to bond modulators 150 onto substrate 110. As illustrated in FIG. 5B, epoxy layer 160 is flowed between the substrate 110 and modulator substrate 152. Suitable epoxy for epoxy layer 160 includes, for example, polyoxyalkyleneamine. In some cases, this epoxy layer may be directly used as the waveguide confining layer 140 (or cladding layer) below the waveguide layer, as shown in FIG. 1, without an additional cladding layer. Then, as illustrated in FIG. 5C, modulator substrate 152 is removed. The modulator substrate 152 may be removed by a conventional etch-removal process.

As illustrated in FIG. 5D, coupling structures 134 comprising prism elements are formed on top of modulators 150. The prism elements may be fabricated using gray scale lithography and inductively-coupled plasma (ICP) etching. Alternatively, the prism elements may be fabricated from chalcogenide glass. As illustrated in FIG. 5E, a waveguide confining layer 140 may be formed on top of the epoxy layer around coupling structures 134. The waveguide confining layer may be spun-on in a conventional manner. Finally, as illustrated in FIG. 5F, the waveguide 130 is fabricated around coupling structures 134, such that the coupling structures 134 are embedded in the waveguide portions 132. The waveguide 130 may also be spun-on in a conventional manner. It will be understood that the above fabrication steps provide only an example for the fabrication of components of optical interconnect system 100. Additional or alternative steps than those described above will be understood by one of ordinary skill in the art from the description herein.

Figure 6:
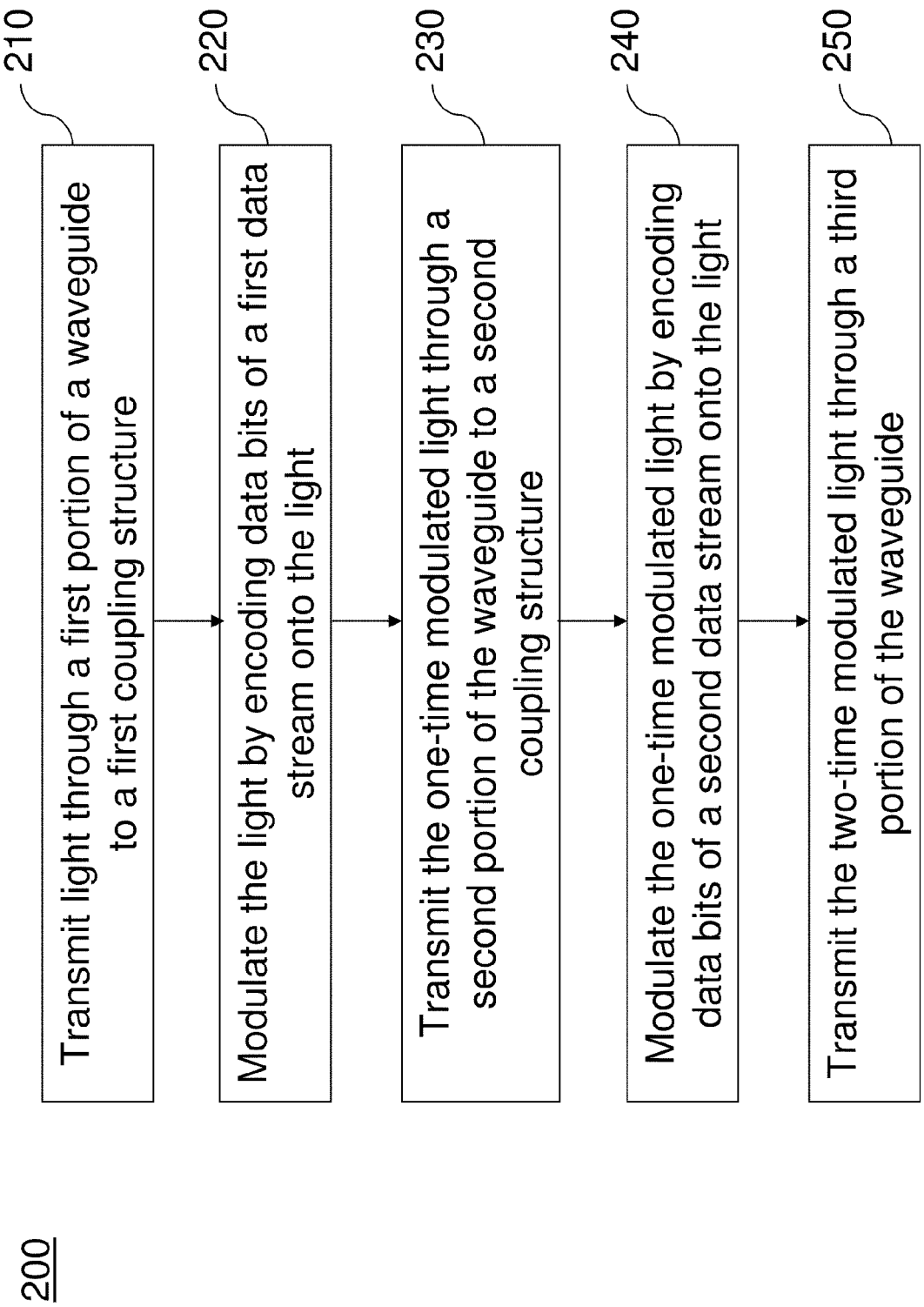
FIG. 6 is a flowchart illustrating an exemplary method for operating the optical interconnect system of FIG. 1.

An exemplary method 200 for operating optical interconnect system 100 will now be described with respect to FIG. 6 in accordance with one aspect of the present invention. In accordance with this aspect of the present invention, optical interconnect system 100 is operated as an optical dual-channel multiplexer, as described below.

In step 210, light source 180 directs light into the first waveguide portion 132*a* of optical waveguide 130. Coupling structure 134*a* redirects the light from first waveguide portion 132*a* onto modulator 150*a*. In step 220, modulator 150*a* modulates the light a first time, thereby generating "one-time modulated" light. Modulator 150*a* modulates the light by encoding the light with a first data stream $D_1$ through selective absorption or reflection of optical "bits". The one-time modulated light is redirected into second waveguide portion 132*b* of optical waveguide 130 via coupling structure 134*a*.

In step 230, the one-time modulated light is then transmitted through second waveguide portion 132*b* until it reaches coupling structure 134*b*. Coupling structure 134*b* redirects the light from second waveguide portion 132*b* onto modulator 150*b*. In step 240, modulator 150*b* modulates the light a second time, thereby generating "two-time modulated" light. Modulator 150*b* modulates the light by encoding the light with a second data stream $D_2$ through selective absorption or reflection of the same optical bits. Desirably, the encoded data streams are synchronized to account for the distance between first and second modulators 150*a* and 150*b*, so that modulators 150*a* and 150*b* encode their data streams on the same optical bits. Thus, each optical bit of the two-time modulated light has an intensity that corresponds simultaneously to a bit from both data streams $D_1$ and $D_2$.

To control the encoding of data streams $D_1$ and $D_2$, modulators 150*a* and 150*b* are connected to electrical circuitry 170 in substrate 110. Electrical circuitry 170 controls the switching of the modulators in order to encode the first and second data streams $D_1$ and $D_2$ into the light. Electrical circuitry 170 controls the switching by applying predetermined voltage biases to modulators 150a and 150b. In an exemplary embodiment, first modulator 150a is operated between reverse bias voltages of $V_0$ and $V_1$. Similarly, second modulator 150b is operated between reverse bias voltages of $V_0$ and $V_2$. The amplitude of the voltage applied to modulators 150a and 150b affects how much light the modulators absorb or reflect. Thus, the voltages $V_1$ and $V_2$ may be selected such that different voltages are applied when switching the first and second modulators. This may cause each modulator to absorb or reflect a different percentage of the modulated light, thereby enabling the two data streams $D_1$ and $D_2$ to be differentiated at photosensor 190.

Then, in step 250, the two-time modulated light is redirected into third waveguide portion 132c of optical waveguide 130 via coupling structure 134b. The two-time modulated light is then received by photosensor 190. Photosensor 190 generates a photocurrent that is proportional to the intensity of the received light. Electrical circuitry 170 of substrate 110 is configured to determine how the light received by photosensor 190 has been modulated by modulators 150a and 150b based on the generated photocurrent. For example, electrical circuitry 170 includes a transimpedance amplifier (TIA) followed by a decoder, to process the generated photocurrent. Electrical circuitry 170 is configured to determine whether the light has been partially absorbed by modulators 150a and/or 150b. This enables optical interconnect system 100 to generate four output levels on each optical bit: substantially reflected by modulators 150a and 150b, partially absorbed by only modulator 150a, partially absorbed by only modulator 150b, or partially absorbed by modulators 150a and 150b. Thus, electrical circuitry can identify and reproduce the original data streams $D_1$ and $D_2$.

As set forth above, it will be understood that while two modulators are described, the invention is not so limited. Additional modulators may be added to obtain additional output levels for optical interconnect system 100. In an exemplary embodiment, a third modulator 150c may operate between $V_0$ and $V_3$. While use of two modulators 150a and 150b enables four possible output levels, adding a third modulator results in a total of 9 possible output levels. Similarly, additional modulators 150 may be added to enable more optical output levels (16, 25, 36, etc.), thereby providing a high bandwidth optical interconnect.

Figure 7:
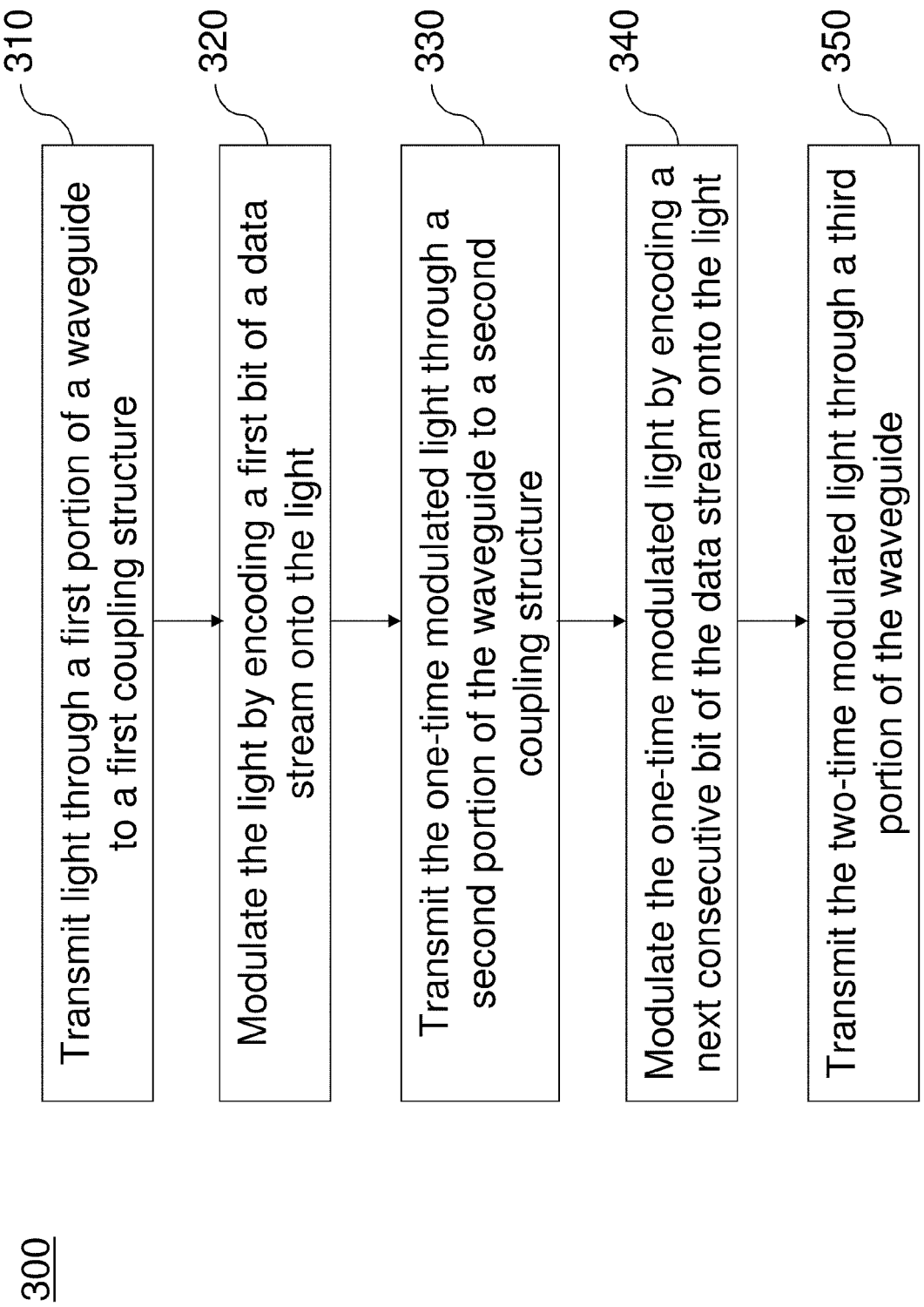
FIG. 7 is a flowchart illustrating another exemplary method for operating the optical interconnect system of FIG. 1.

An exemplary method 300 for operating optical interconnect system 100 will now be described with respect to FIG. 7 in accordance with another aspect of the present invention. In accordance with this aspect of the present invention, optical interconnect system 100 is operated as an optical pulse amplitude modulator, as described below.

In step 310, light source 180 directs light into the first waveguide portion 132a of optical waveguide 130. Coupling structure 134a redirects the light from first waveguide portion 132a onto modulator 150a. In step 320, modulator 150a modulates the light a first time, thereby generating "one-time modulated" light. Modulator 150a modulates the light by encoding the light with a first bit of data stream $D_1$ through selective absorption or reflection of optical "bits". The one-time modulated light is redirected into second waveguide portion 132b of optical waveguide 130 via coupling structure 134a.

In step 330, the one-time modulated light is then transmitted through second waveguide portion 132b until it reaches coupling structure 134b. Coupling structure 134b redirects the light from second waveguide portion 132b onto modulator 150b. In step 340, modulator 150b modulates the light a second time, thereby generating "two-time modulated" light. Modulator 150b modulates the light by encoding the light with the next consecutive bit of data stream $D_1$ through selective absorption or reflection of the same optical bits. Desirably, the encoding are synchronized to account for the distance between first and second modulators 150a and 150b, so that modulators 150a and 150b encode consecutive digital bits from data stream $D_1$ on the same optical bit. Thus, each optical bit of the two-time modulated light has an intensity that corresponds simultaneously to two consecutive bits from data stream $D_1$.

Then, in step 350, the two-time modulated light is redirected into third waveguide portion 132c of optical waveguide 130 via coupling structure 134b. The two-time modulated light is then received by photosensor 190. Electrical circuitry 170 of substrate 110 is configured to determine how the light received by photosensor 190 has been modulated by modulators 150a and 150b, as described above with respect to the multiplexing operation. In this embodiment, electrical circuitry 170 may include a TIA, a decoder, and a data serializer. Thus, electrical circuitry can identify and reproduce the original data stream $D_1$.

As set forth above, it will be understood that while two modulators are described, the invention is not so limited. Additional modulators may be added to obtain additional output levels for optical interconnect system 100. In an exemplary embodiment, a third modulator 150c may be used. While use of two modulators 150a and 150b enables encoding two consecutive bits, adding a third modulator results in the ability to encode three consecutive bits of data stream $D_1$.

Aspects of the present invention achieve advantages not present in prior art optical interconnect systems and methods, as set forth below.

The present invention provides improved bandwidth over conventional single wavelength optical communication channels. The proposed systems and methods may be usable to double the bandwidth of the optical channel. The 4-level optical pulse amplitude modulation (PAM-4) described herein provides advantages over convention systems by reducing frequency-dependent dispersion and the modal dispersion as compared to conventional binary optical signaling. The implementation of optical PAM-4 set forth in this application negates the need for digital-to-analog converters, which typically use a significant amount of power.

The optical interconnect systems and methods described herein enable system synchronization by precise clock distribution and can help alleviate design problems such as crosstalk and voltage isolation. Further, the optical interconnects described herein may negate the need for repeaters, thereby saving silicon real estate and the power consumption associated with the repeaters.

Although the invention is illustrated and described herein with reference to specific embodiments, the invention is not intended to be limited to the details shown. Rather, various modifications may be made in the details within the scope and range of equivalents of the claims and without departing from the invention.

What is claimed:
1. An optical interconnect system comprising:
    a substrate;
    an optical waveguide disposed on the substrate, the optical waveguide having:
        a first waveguide portion extending to a first coupling structure, the first coupling structure comprising a tapered end of the first waveguide portion;
        a second waveguide portion extending from the first coupling structure directly to a second coupling structure, the second coupling structure comprising a tapered end of the second waveguide portion; and a third waveguide portion extending from the second coupling structure;

a first modulator mounted to the substrate, the first modulator positioned adjacent the first coupling structure; and a second modulator mounted to the substrate, the second modulator positioned adjacent the second coupling structure.

2. The optical interconnect system of claim 1, wherein:

the first coupling structure further comprises another tapered end of the second waveguide portion; and the second coupling structure further comprises a tapered end of the third waveguide portion.

3. The optical interconnect system of claim 1, wherein the first and second modulators each comprise a multiple quantum well modulator.

4. The optical interconnect system of claim 1, further comprising:

a photosensor mounted to the substrate, the photosensor positioned to receive a light transmitted by the third waveguide portion.

5. The optical interconnect system of claim 1, further comprising:

a light source positioned to provide a light to the first waveguide portion.

6. The optical interconnect system of claim 1, wherein the substrate comprises electrical circuitry for switching the first and second modulators.

7. An optical interconnect system comprising:

a substrate;

an optical waveguide disposed on the substrate, the optical waveguide having:

a first waveguide portion extending to a first coupling structure;

a second waveguide portion extending from the first coupling structure to a second coupling structure; and a third waveguide portion extending from the second coupling structure;

a first modulator mounted to the substrate, the first modulator positioned adjacent the first coupling structure and configured to modulate a beam of light traveling through the optical waveguide; and a second modulator mounted to the substrate, the second modulator positioned adjacent the second coupling structure and configured to modulate the beam of light traveling through the optical waveguide, wherein the substrate comprises electrical circuitry for switching the first and second modulators, and wherein the electrical circuitry is configured to (a) switch the first modulator to encode data bits of a first data stream onto the beam of light traveling through the optical waveguide and (b) switch the second modulator to encode data bits of a second data stream onto the same beam of light traveling through the optical waveguide.

8. An optical interconnect system comprising:

a substrate;

an optical waveguide disposed on the substrate, the optical waveguide having:

a first waveguide portion extending to a first coupling structure;

a second waveguide portion extending from the first coupling structure to a second coupling structure; and a third waveguide portion extending from the second coupling structure;

a first modulator mounted to the substrate, the first modulator positioned adjacent the first coupling structure; and a second modulator mounted to the substrate, the second modulator positioned adjacent the second coupling structure, wherein the substrate comprises electrical circuitry for switching the first and second modulators, wherein the electrical circuitry is configured to (a) switch the first modulator to encode data bits of a first data stream onto light traveling through the optical waveguide and (b) switch the second modulator to encode data bits of a second data stream onto the light traveling through the optical waveguide, and wherein the first and second modulators are synchronized such that respective data bits of the first and second data streams are encoded on the same optical bit of the light traveling through the optical waveguide.

9. An optical interconnect system comprising:

a substrate;

an optical waveguide disposed on the substrate, the optical waveguide having:

a first waveguide portion extending to a first coupling structure;

a second waveguide portion extending from the first coupling structure to a second coupling structure; and a third waveguide portion extending from the second coupling structure;

a first modulator mounted to the substrate, the first modulator positioned adjacent the first coupling structure; and a second modulator mounted to the substrate, the second modulator positioned adjacent the second coupling structure, wherein the substrate comprises electrical circuitry for switching the first and second modulators, and wherein the electrical circuitry is configured to (a) switch the first modulator to encode a first data bit of a data stream onto light traveling through the optical waveguide and (b) switch the second modulator to encode a next consecutive data bit of the data stream onto the light traveling through the optical waveguide.

10. The optical interconnect system of claim 9, wherein the first and second modulators are synchronized such that consecutive data bits of the data stream are encoded on the same optical bit of the light traveling through the optical waveguide.

* * * * *